United States Patent [19]

Kalfoglou et al.

[11] 4,157,306

[45] Jun. 5, 1979

[54] TERTIARY OIL RECOVERY PROCESS UTILIZING A PREFLUSH

[75] Inventors: George Kalfoglou, Houston; Kenoth H. Flournoy, Levelland, both of Tex.

[73] Assignee: Texaco Inc., White Plains, N.Y.

[21] Appl. No.: 867,747

[22] Filed: Jan. 9, 1978

Related U.S. Application Data

[62] Division of Ser. No. 718,993, Aug. 30, 1976.

[51] Int. Cl.$^2$ .............................................. E21B 43/22
[52] U.S. Cl. .............................. 252/8.55 D; 166/273; 166/274; 252/310
[58] Field of Search ..................... 252/8.55 D, 8.55 R, 252/310, 313

[56] References Cited

U.S. PATENT DOCUMENTS

| | | | |
|---|---|---|---|
| 3,500,921 | 3/1970 | Abrams et al. | 166/273 |
| 3,508,612 | 4/1970 | Reisberg et al. | 252/8.55 X |
| 3,817,330 | 6/1974 | Christopher et al. | 166/275 |
| 3,818,989 | 6/1974 | Christopher et al. | 166/274 |
| 3,827,497 | 8/1974 | Dycus et al. | 166/274 |
| 3,858,656 | 1/1975 | Flournoy et al. | 252/8.55 X |
| 3,868,328 | 2/1975 | Boothe et al. | 252/8.55 |
| 3,977,471 | 8/1976 | Gale et al. | 252/8.55 X |

*Primary Examiner*—Herbert B. Guynn
*Attorney, Agent, or Firm*—Carl G. Ries; Thomas H. Whaley; Walter D. Hunter

[57] ABSTRACT

An adjusted salinity and hardness, aqueous preflush containing a thickening material which can be, for example, a hydrophilic material such as polyacrylamide, polysaccharide, polyvinyl aromatic sulfonate, polyethylene oxide, methyl cellulose, etc. or colloidal silica, etc. in a concentration sufficient to increase the viscosity of the adjusted salinity aqueous preflush fluid is injected into a subterranean, petroleum-containing formation. Optionally, the preflush fluid may contain a sacrificial agent, such as sodium tripolyphosphate, etc. The high salinity formation water is efficiently displaced by viscous low salinity aqueous preflush fluid to increase the effectiveness of a subsequently injected high salinity sensitive single surfactant solution. The surfactant may be displaced by a mobility buffer solution, which then may be displaced by water.

3 Claims, No Drawings

TERTIARY OIL RECOVERY PROCESS UTILIZING A PREFLUSH

This is a division of application Ser. No. 718,993, filed Aug. 30, 1976.

BACKGROUND OF THE INVENTION

1. Field of the Invention

This invention relates to a method for recovering petroleum from subterranean formations by the injection of flood water containing a surfactant or mixture of surfactants. More particularly, this invention involves the injection of a preflush fluid of adjusted salinity water having therein a thickening agent to efficiently displace the high salinity formation water.

2. Prior Art

Many subterranean petroleum-containing formations contain natural energy in the form of active bottom water drive, solution gas drive, or gas cap drive, in sufficient quantity to drive the petroleum to the production well from which it can be transported to the surface. This phase of oil recovery, known as primary recovery, recovers only a portion of the petroleum originally in place. When the natural energy source has been depleted, or in those formations where insufficient natural energy was originally present to permit primary recovery, some form of supplemental treatment is required to recover additional oil from the formation. Water flooding is by far the most economical and widely practiced supplemental recovery procedure. Water flooding is accomplished by injecting water into the formation via one or more injection wells. The injected water displaces and moves the petroleum toward one or more production wells, where it is transported to the surface. Water flooding is also quite inefficient, and approximately 50 percent or more of the original oil remains in the formation at the termination of conventional water flooding operations.

Numerous factors are responsible for the failure of water flooding to recover a high percentage of the oil remaining in the formation after primary recovery. A low viscosity fluid displaces a higher viscosity fluid quite inefficiently, because the low viscosity displacing fluid channels through the high viscosity fluid. The displacement efficiency can be related mathematically to the mobility ratio of the displacing and displaced fluids. Various additives have been proposed in the prior art to alleviate this problem. Hydrophilic polymers which increase the viscosity of the displacing fluid, improve the mobility ratio and decrease the tendency for the displacing fluid to channel or finger into and inefficiently displace the higher viscosity petroleum. U.S. Pat. No. 3,039,529 (1962) discloses the use of polyacrylamide polymer to increase the viscosity of injected water to improve the mobility ratio and hence the oil displacement efficiency of an oil recovery process. U.S. Pat. No. 3,282,337 describes the use of polyethylene oxide as a thickener for injection water for the same purpose.

The immiscibility of water and petroleum, and the high surface tension existing between water and petroleum also contribute significantly to the inefficient displacement of oil by water. The use of a surfactant to lower this surface tension will improve the displacement efficiency. For example, U.S. Pat. No. 2,233,381 (1941) discloses the use of polyglycol ether as a surfactant in an oil recovery process. U.S. Pat. No. 3,032,713 (1967) discloses the use of a particular petroleum sulfonate as a surfactant for oil recovery products. U.S. Pat. No. 3,468,377 describes the use of petroleum sulfonate having a specified molecular weight distribution as a surfactant for oil recovery.

The combined use of a surfactant solution to decrease the surface tension between the injected aqueous fluid and the petroleum contained in the formation, and a solution of a polymeric material to improve the mobility ratio and sweep efficiency provide a very efficient petroleum recovery process. For example, U.S. Pat. No. 3,477,511 (1969) describes the use of a surfactant solution followed by thickened water to displace the surfactant solution through the formation. Many other combinations of surfactants and water thickening polymers have been proposed, all sharing the common feature of specifying that the surfactant must precede the viscous fluid for optimum recovery efficiency.

Most of the chemicals which have been proposed in the above-cited references for improving the mobility ratio of the injected fluid and for reducing the surface tension between the injected fluid and the formation petroleum, require a specific, low salinity fluid environment to function effectively.

The salinity sensitivity of the most desirable surfactants for use in oil recovery has a substantial impact on the economics of a proposed supplement recovery operation employing a surfactant. While it has been generally recognized in the industry for many years that surfactants capable of reducing the interfacial tension between the injected fluid and the formation petroleum would improve the oil recovery efficiency of a supplemental oil recovery program, it has never been demonstrated that the additional oil which can be recovered under field conditions is sufficient to justify the cost of the surfactant. This is especially true because of the enormous quantity of surfactant which must be employed in a field, in order to have a significant effect on the displacement efficiency. If high formation water salinity results in a shift in surfactant choice to a higher cost material or if a greater concentration of surfactant must be used, the cost of a surfactant flood will be increased substantially. It is known, however, that many millions of barrels of oil remain unrecovered in a petroleum reservoir at the conclusion of conventional water flooding operations, and with an impending shortage of readily recoverable crude oil, it is becoming a matter of paramount national importance to devise a reasonably economical method of recovering this oil.

SUMMARY OF THE INVENTION

In the present invention, there is provided a new and improved surfactant flood oil recovery process whereby high salinity formation water is effectively displaced by injecting into a petroleum-bearing formation via an injection well a preflush of a thickened lower salinity aqueous fluid selected from the group comprising (A) an aqueous fluid having dissolved therein a small amount of hydrophilic polymer, (B) an aqueous fluid containing a small amount of colloidal silica, and (C) an aqueous fluid having dissolved therein a small amount of hydrophilic polymer and a small amount of colloidal silica. Useful polymers include, for example, polyacrylamide, polysaccharide, methyl cellulose, polyethylene oxide, or polyvinyl aromatic sulfonate, etc. In a second step an aqueous surfactant solution which may, if desired, also contain a polymeric thickening agent, is injected into the formation via the injection well and finally the petroleum displaced by the injections is recovered through a production well.

Various surfactant systems which have been formulated to perform in formation waters of moderate salinity and hardness [e.g., 80,000 ppm TDC (total dissolved solids)] have been described in the patent literature. There are reservoirs which have very high salinity and hardness (e.g., 200,000 ppm TDC) connate water. Most often these reservoirs are water flooded with fresh water, thus lowering the salinity and hardness of formation water to moderate levels. In actuality, most reservoirs (especially limestone reservoirs) are heterogeneous. Because of permeability heterogeneities and the poor sweep efficiency of water flooding, formations end up with zones of varying salinity and hardness. Such formations have unfavorable salinity conditions for successful surfactant flooding. Surfactant systems tailored for certain salinity and hardness levels do not perform effectively at quite different salinity and hardness environments. Poor oil recovery is expected from tertiary oil recovery processes applied to reservoirs with heterogeneous permeabilities. The reason being in a tertiary oil recovery process the surfactant slug followed by a mobility control slug because of the improved mobility control will invade zones which were not contacted by water during water flooding. Oil will not effectively be mobilized from such zones because of the existing unfavorable salinity and hardness conditions.

In the improved process of this invention the reservoir is preflushed with a slug having the desired salinity and containing a mobility control agent. This preflush slug will improve the sweep efficiency and contact areas unswept by water during the previously performed waterflood. Thus, the wide salinity distribution within the heterogeneous pay zone will be narrowed to a range suitable for the surfactant system designed for that reservoir.

Also it is desirable to maintain a favorable mobility control during the surfactant injection by either employing a surfactant system of viscosity matching that of the preceding preflush slug (which contains a mobility control agent) or to incorporate a mobility control agent into the surfactant slug. The process of this invention will effectively condition a heterogeneous reservoir and narrow the wide salinity variations existing within a pay zone, thus resulting in higher oil recovery efficiency than would be obtained with surfactant flood, including no such preflush.

DETAILED DESCRIPTION OF THE INVENTION

Type A Fluids

Type A fluids as described above generally will have dissolved therein from about 0.01 to about 0.10 percent by weight of a hydrophilic polymer such as polyacrylamide. Such aqueous fluids exhibit a viscosity of from about 6 to about 15 centipoises (measured at a shear rate of 300 reciprocal seconds) and are sufficient to effectively increase the efficiency of displacement of high salinity formation water by the preflush solution.

Type B Fluids

Colloidal silica useful in this invention in Types B and C fluids described above is different from precipitated silica or silica gel. The colloidal silica useful in this invention is a fumed silica which is made up of chain-like formations sintered together. These chains are branched and have enormous external surface areas of from about 50 to about 400 meters$^2$/gram and each segment in the chain has many hydroxyl (OH) groups attached to silicon atoms at the surface. When the segments come into proximity to each other, these hydroxy groups will bond to each other by hydrogen bonding to form a three dimensional network.

Colloidal silica acceptable for use in the method of this invention will generally have a particle size ranging from about 7 to 15 millimicrons (m$\mu$). In this size range the colloidal silica will pass through even reservoirs with very small pore size. For example, a reservoir having very low permeability of say 0.016 millidarcies (md) has a correspondingly small pore size of 25 to 100 m$\mu$. Thus, the colloidal silica suitable for use in the process of this invention will pass through even the smallest pores encountered in hydrocarbon reservoirs and will maintain a constant viscosity in the displacing fluid.

Colloidal silicas are readily available from a number of manufacturers. One source is the Cabot Corporation of Boston, Massachusetts which markets colloidal silica under the trade name CAB-O-SIL. Colloidal silica is also available from other commercial sources and the reference to one source is not intended to limit the scope of this invention.

When the silica particles are dispersed in liquid medium, the network structure formed by the silica particles restricts the movement of the molecules of the liquid medium and results in an increase in the viscosity of the liquid.

Generally the Type B fluids will contain from about 0.05 to about 0.6 percent by weight of colloidal silica and preferably they will contain about 0.05 to about 0.1 percent by weight.

If desired, the Type B fluid can contain from about 0.001 to about 0.01 percent by weight or more of a surfactant based on the weight of the fluid which can be, for example, a soap, the sodium salt of a high molecular weight sulfate or sulfonate, etc. Generally, the surfactant employed will be of the anionic type as exemplified by surfactants of the formula

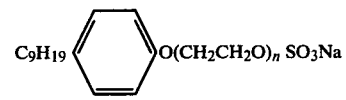

where n is an integer of from 2 to about 10.

Type C Fluids

In this invention the Type C fluids as described above will contain from about 0.01 to about 0.10 percent by weight of the hydrophilic polymer and from about 0.05 to about 0.60 percent by weight of colloidal silica. The thickened low salinity aqueous preflush fluid may be followed directly by the surfactant solution utilized in this invention, the choice of which will be influenced principally by formation and petroleum characteristics of the particular reservoir in which the supplemental recovery procedure is conducted. It is sometimes desirable to use an unreacted water isolation slug between the preflush solution and the surfactant solution. Alternatively, the polymer concentration in the preflush fluid may be decreased gradually or tapered to more nearly match the viscosity of the following surfactant solution. The surfactant solution may then be displaced by the injection of water, or it may be followed by a thickened water to more efficiently move the surfactant solution through the formation. Depending on the existence of other problems which may be anticipated or known to exist, other chemical treating agents may be included in the preflush slug. For example, precipitating or chelating agents for removing interfering polyvalent ions, sacrificial adsorption agents which adsorb on the formation rock to prevent adsorption of the subsequently injected surfactants, or chemicals to desensitize water sensitive clays present in the formation to prevent permeability loss due to swelling of such clays on contact with fresh water, may be added to the preflush solution. By the use of this low salinity aqueous preflush fluid, many chemicals such as detergents, emulsifiers, foaming agents, etc. which are sensitive to high salinity environments, may be used in formations having relatively high salinity formation water.

Surfactants of the type described for use in the Type B fluids may also be utilized, if desired, in the Type C fluids. The amount of the surfactant employed in the Type C fluid will be from about 0.001 to about 0.01 percent by weight or more based on the weight of the fluid.

In practicing this invention, a thickened aqueous fluid of Type A, B, or C as described above is injected through an injection well and into the subterranean petroleum-containing formation. The salinity of this aqueous solution should be less than the salinity of the formation water, and preferably from about zero to about 100,000 part per million. Frequently, this operation will be conducted in a formation which has previously been subjected to conventional water flooding, although this is not essential for the practice of this invention. The aqueous preflush solution containing the polymeric thickener or colloidal silica, etc. is followed by an aqueous surfactant solution, which is in turn followed by the injection of water. Water injection is continued, and the injected water displaces the oil within the subterranean petroleum-containing formation and moves it, together with the surfactant solution, toward one or more production wells. Energy for the displacement process is furnished by the pumps injecting the aqueous fluids and water into the injection well, which forces the oil through the formation to the production wells and then to the surface of the earth.

Numerous polymers are usable in our invention, and one of the most satisfactory is a hydrolyzed polyacrylamide which may be graphically illustrated by the following formula:

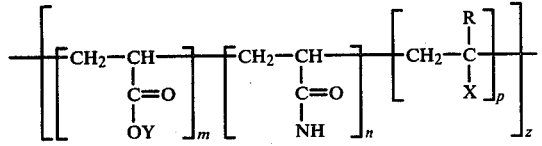

wherein Y represents hydrogen, ammonium, and alkali metal or an alkaline earth metal, R represents hydrogen or a metal radical, X represents chlorine, a lower alkoxy or acyloxy group or a cyanide radical, m ranges from 12 to 67, n ranges from 33 to 88, p ranges from 0 to 10, and the sum of m, n, and p equals 100, and z is at least about 60. This class of polymers is known for the purpose of increasing the viscosity of the injected fluid and the efficiency with which the injected fluid displaces petroleum, specifically being disclosed in U.S. Pat. No. 3,039,529 (1962).

Other excellent polymers for use in the aqueous preflush solution for the practice of the subject invention are the polyvinyl aromatic sulfonates having relatively high molecular weights and yet being soluble in water. Polymers of this class have the following general formula:

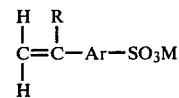

wherein Ar is divalent monocyclic hydrocarbon unit derived from benzene or benzene derivatives, R is hydrogen or a metal ion, and M is hydrogen, sodium or potassium. The use of this polymer for mobility ratio improvement in oil recovery operations is more fully detailed in U.S. Pat. No. 3,282,337 (1966).

Another class of hydrophilic polymers which can be used to thicken the low salinity aqueous preflush of the subject invention is the flocculant grade water soluble polyethylene oxides such as are described in U.S. Pat. No. 3,021,231. The use of such polyethylene oxides to thicken injected water for displacement of viscous crude oil is described in U.S. Pat. No. 3,282,337 (1966).

Another class of hydrophilic polymer water thickening materials suitable for use in this invention is the polysaccharide compounds, many of which are readily available commercially. For example, in U.S. Pat. No. 3,208,518 there is disclosed a water flooding process wherein the viscosity of the flooding medium is increased by the use of high molecular weight polymers, specifically an ionic polysaccharide produced by the fermentation of carbohydrates by bacteria of the genus Xanthomonas, under controlled pH conditions.

From about 0.02 to about 0.5 and preferably from 0.1 to about 0.3 pore volumes of the aqueous preflush solution containing the viscosity increasing polymer or colloidal silica should be injected into the formation for the purpose of displacing the high salinity formation water from the flow channels in advance of the surfactant flood. It is desired that a sufficient volume of the preflush solution be used to insure that the discreteness of the solution is maintained throughout the formation. The quantity of preflush solution required will depend on the well spacing of the particular pattern being employed. The lower end of the pore volume range may safely be used in the instance of fairly close well spacing whereas the higher end of the range is preferred where large well spacing is employed since the solution will be subjected to greater radial spreading and mixing as it progresses through the formation in advance of a surfactant. A small volume tends to lose its discreteness in a field using large well spacing.

If the surfactant solution to be injected after the preflush solution has a viscosity less than the viscosity of the preflush solution, it will be necessary either to provide an isolation slug of from about 0.05 to about 0.5 pore volumes of untreated water between the preflush solution and the surfactant solution, or to taper the concentration of the viscosity increasing hydrophilic polymeric material in the preflush solution so the preflush solution viscosity at least equal to and preferably less than the viscosity of the subsequently injected surfactant solution.

A wide variety of surfactants may be employed in the practice of this invention. Generally, the concentration of the surfactant or surfactants in the solution injected into the formation will be from about 0.05 to about 20.0 percent and, preferably, from about 0.05 to about 5.0 percent by weight. The quantity of the surfactant solution injected will be from about 0.02 to about 0.50 pore volume.

An especially useful surfactant composition for use in this invention comprises a solution of a mixture of a petroleum sulfonate and a solubilizer such as a polyethoxylated alkyl aryl sulfonate or sulfate and alkali metal and ammonium salts thereof. Suitable sulfonates include those having the formula:

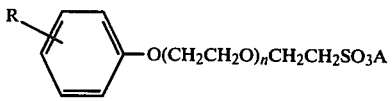

wherein R is alkyl of from 8 to 22 carbon atoms, n is an integer of from 2 to about 10 and A is selected from the group consisting of hydrogen, sodium and potassium and ammonium. Usually the petroleum sulfonate will constitute about 65 percent by weight of the surfactant mixture although this may be varied somewhat depending on the salinity of the reservoir water, the specific surfactants used, etc. One example of a useful surfactant mixture of this type comprises the following materials:

Petroleum Sulfonate: Blend of high and low equivalent weight petroleum sulfonates.

Solubilizer: $C_9H_{19}$—⟨benzene⟩—$O(CH_2CH_2O)_5CH_2CH_2SO_3Na$ or the sulfate.

A second group of surfactant compositions suitable for use in the process of this invention comprises a solution of a mixture of a solubilizer which can be, for example, a polyethoxylated alkyl aryl sulfonate or sulfate of the same type as previously described and alkali metal and ammonium salts thereof of the same type as previously described and a synthetic sulfonate, such as an alkyl benzene sulfonate wherein the alkyl group has from 8 to 22 carbon atoms as exemplified by dodecyl benzene sulfonate, hexadecyl benzene sulfonate, the potassium salt of octadecyl benzene sulfonate, etc. Generally, the polyethoxylated alkyl aryl sulfonate will constitute about 40 to about 60 weight percent of this surfactant mixture and the actual concentration employed will depend on the salinity of the reservoir water, the particular surfactants utilized, etc. An example of a suitable surfactant mixture of this type consists of the following compounds:

Synthetic Sulfonate: $C_{12}H_{25}$—⟨benzene⟩—$SO_3Na$

Solubilizer: $C_9H_{19}$—⟨benzene⟩—$O(CH_2CH_2O)_4CH_2CH_2SO_3Na$ or the sulfate.

A third group of surfactant compositions suitable for use in the process of this invention comprises a solution of a polyethoxylated alkyl aryl sulfonate or sulfate of the same type as previously described, a polyethoxylated alcohol sulfonate or sulfate and the alkali metal or ammonium salts of these two materials. Polyethoxylated alcohols suitable for use in preparing the polyethoxylated alcohol sulfonate or sulfate have the formula:

$$RO(CH_2CH_2O)_mH$$

wherein R is alkyl of from 8 to about 22 carbon atoms and m is an integer of from 2 to about 18. Examples of surfactants useful in formulating solutions of the type described above include:

(a)
Sulfonate: $C_{12}H_{25}$—⟨benzene⟩—$O(CH_2CH_2O)_3CH_2CH_2SO_3Na$ or

Sulfate: $C_{12}H_{25}$—⟨benzene⟩—$O(CH_2CH_2O)_4SO_3Na$ (b)
Sulfonate: $C_{16}H_{33}$—$O(CH_2CH_2O)_3CH_2CH_2SO_3Na$ or Sulfate: $C_{16}H_{33}$—$O(CH_2CH_2O)_4SO_3Na$ Petroleum sulfonates which are presently among the more popular classes of surfactants being considered for supplemental oil recovery techniques may also be used in this process. The various materials available under the general name of petroleum fraction used for sulfonation and in the degree of sulfonation imparted to the petroleum fraction. A preferable petroleum sulfonate is described in U.S. Pat. No. 3,302,713 (1967) disclosing a petroleum sulfonate prepared from a petroleum fraction whose boiling range is from 700° F. to 1100° F. which corresponds to a molecular weight range of from about 350 to about 600. The sodium salt of the sulfonation product of this petroleum fraction is an excellent material for use in the subject invention.

Petroleum sulfonates are particularly desirable surfactants to use for oil recovery operations because of their low cost per unit weight and relatively high surface activity. One serious shortcoming, however, is their low tolerance to salinity. For this reason, petroleum sulfonates are especially benefitted by the subject invention, which provides a means for displacing high salinity formation water so the surfactant can function more effectively and in a relatively low concentration range. The upper limit of salinity tolerance for most commonly used petroleum sulfonates is around 2 percent or 20,000 parts per million, although the optimum performance is realized at a lower salinity. If the salinity of the formation water is in the range of 1 percent or less, or if it can be reduced to a level of 1 percent or less, the petroleum sulfonate solution will exhibit its maximum degree of surface activity and will function most efficiently at a lower concentration. Ordinarily, the concentration of petroleum sulfonate in the surfactant solution should be from about 0.05 percent to about 15 percent and preferably from about 1.0 percent to about 5.0 by weight. If a particular viscous crude is to be displaced, it is necessary to include in the surfactant solution a quantity of hydrophilic polymer to increase the viscosity of the surfactant solution so that a more favorable mobility ratio will exist between the surfactant solution and the displaced formation petroleum. It is preferably to use the same hydrophilic polymeric material in the surfactant solution as was used in the preflush solution. In any event the viscosity of the surfactant solution should be slightly greater than the viscosity of the preflush solution, and so from about 50 to about 5000 and preferably from about 200 to about 1000 parts per million of the viscosity increasing hydrophilic polymer should be used therein. The surfactant solution will tend to accumulate droplets of oil dispersed in the solution, so the viscosity of the surfactant solution will increase as it progresses through the formation. For this reason, it is preferable to add a greater amount of the viscosity increasing hydrophilic polymer to the first portion of surfactant solution injected into the formation and lesser amount of polymer to the latter portions.

Type B and C fluids may contain in addition to the ingredients already mentioned a small amount of a friction reducing water-soluble polymer. These friction reducing polymers are effective in fresh water, brines and other fluids and in addition they are temperature stable and shear stable. Finally, they are effective at low concentrations. The friction reducing polymers employed in this invention are random, linear (including lightly crosslinked, high molecular weight water-soluble polymers containing at least 1 percent by weight of (3-acrylamido-3-methyl) butyl trimethyl ammonium chloride and/or its analogs.

The friction-reducing polymers useful in this invention can be prepared by free radical polymerization methods. Polymerization by such a method may be affected by contacting the monomer or monomers such as (3-acrylamido-3-methyl) butyl trimethyl ammonium chloride and, for example, acrylamide. Preferably, the friction reducing copolymer employed in this invention will be a copolymer consisting essentially of from about 1.0 to about 100 percent by weight of (3-acrylamido-3-methyl) butyl trimethyl ammonium chloride and from 0 to about 99 weight percent acrylic acid, methacrylic acid, methacrylamide, allyl alcohol, acrylamide, N-vinyl pyridene, N-vinyl pyrrolidone or N-vinyl oxazolidone. The amount of the friction reducing polymer employed in fluids B or C of this invention will range from about 10 to about 1000 parts per million by weight based on the total weight of the fluid. Usually the copolymer employed as friction reducing polymer will have a molecular weight of between about 100,000 and about 1 million or more. The preparation of these friction reducing copolymers is more completely described in U.S. Pat. No. 3,868,328 which is incorporated herein by reference in its entirety.

FIELD EXAMPLE

The following example of field implementation of the subject invention is offered only for purposes of illustrations, and is not meant to be restricted or definitive of the entire invention, the scope of which will be defined more precisely hereinafter in the Claims.

A petroleum-containing formation located at a depth of 5600 feet is exploited by means of conventional water flooding operations using an inverted five spot pattern, until the water-oil ratio rises above 30. The formation thickness is 30 feet and the porosity is 26 percent. In this inverted five spot pattern the center well is employed as an injection well while the four remaining wells serve as production wells. The dimensions of the square grid on which an inverted five spot pattern is based is 500 feet and it is known that only 75 percent of the reservoir will be swept by the injected fluid using the standard five spot pattern. The pore volume of the pattern swept by the injected fluid will be $500 \times 500 \times 30 \times 0.26 \times 0.75 = 1,462,500$ cubic feet. The salinity of the water contained in the formation is 225,000 parts per million which is considerably above the tolerable salinity for petroleum sulfonate and other commonly used surfactants. A total of 0.1 pore volume (146,000 cubic feet) of a preflush solution having a salinity of only about 100,000 parts per million and having dissolved therein 0.03 weight percent of polyacrylamide, 0.01 weight percent of a friction reducing copolymer which is random, linear water-soluble copolymer consisting essentially of about 1 percent by weight of (3-acrylamido-3-methyl) butyl trimethyl ammonium chloride and about 99 weight percent acrylamide and having dispersed therein about 0.02 weight percent of colloidal silica is injected into the formation via the injection well. This is followed by the injection into the formation of 0.1 pore volume (146,000 cubic feet) of aqueous solution having dissolved therein 2.0 percent by weight of a sulfonate surfactant of the formula:

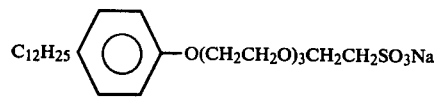

and also having dissolved therein 0.02 weight percent partially hydrolyzed polyacrylamide to increase the solution viscosity to about 9 centipoise. Next 0.1 pore volume (146,000 cubic feet) of water containing 0.03 weight percent of partially hydrolyzed polyacrylamide and having a viscosity of 9.4 centipoise is injected into the formation. This is followed by the injection of water having a salinity of about 100,000 parts per million to displace the oil, surfactant solution and thickened water through the formation. Oil is produced through the associated production wells in the five spot pattern, and the amount of oil produced is substantially in excess of that produced by water flooding alone.

We claim:

1. An aqueous preflush fluid for injection into a subterranean petroleum containing formation containing saline water consisting essentially of a mixture of water having a salinity less than that of the formation water, about 0.05 to about 0.6 percent by weight of colloidal silica having a particle size from about 7 to 15 millimicrons and about 10 to about 1000 parts per million of a random, linear water-soluble friction reducing polymer of a monomer or monomers consisting essentially of from about 1 to about 100 percent by weight of (3-acrylamido-3-methyl) butyl trimethyl ammonium chloride and from 0 to about 99 percent by weight of acrylamide.

2. The aqueous preflush fluid of claim 1 wherein the said fluid also contains about 0.001 to about 0.1 percent by weight of a surfactant.

3. The aqueous preflush fluid of claim 1 wherein the said water is saline water.